Figure 1:
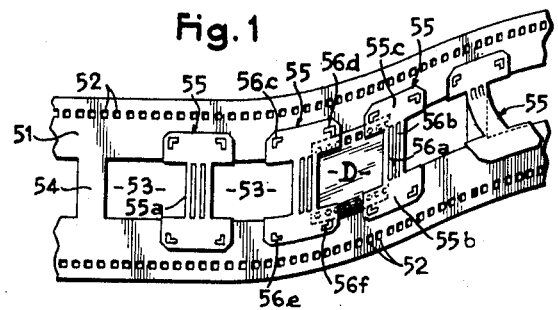

Nov. 23, 1965  D. D. G. ARVIS  3,219,406
HOLDER FOR FLEXIBLE LANTERN SLIDES
Filed Sept. 25, 1961

INVENTOR:
DANIEL DENIS GABRIEL ARVIS

BY Squire & Olcott

ATTYS.

United States Patent Office 3,219,406
Patented Nov. 23, 1965

3,219,406
HOLDER FOR FLEXIBLE LANTERN SLIDES
Daniel Denis Gabriel Arvis, Sevres, France, assignor to Phox-Industrie, Paris (Seine), France, a corporation of France
Filed Sept. 25, 1961, Ser. No. 140,543
Claims priority, application France, Oct. 1, 1960, 840,091
2 Claims. (Cl. 352—233)

The present invention relates generally to holders for passing through the channel of a working apparatus such as a lentern for slide-projections or a viewing apparatus a series of separate flexible slides or transparencies formed on flexible film portions.

The present invention concerns especially a special slide holder insuring ready projections or successive viewings of such slides by associating said separate flexible slides so as to form a continuous unit making it possible to pass said slides consecutively through said apparatus without any interruption between projections or viewings.

It has been suggested, for this purpose, to group such slides in a folded arrangement so as to constitute a block which will unfold before entering the working apparatus and which will fold up when issuing therefrom.

Such a unit is not readily wound in the form of a spool; its use requires employing, upstream of the slide channel of the apparatus, a magazine which will receive the block and will permit the unfolding of a portion of said block and, downstream of the apparatus, a magazine which will receive an unfolded portion of this arrangement and will provide for the reconstitution of said block by folding-up.

Such attachments are space-consuming. The band submitted to repeated folding up is liable to crack along the folding lines; in addition, the fixation of the slides onto such supports proves difficult.

It has been considered to use only slides premounted on a rigid frame, which is a limitation to the use of the apparatus; in some cases, the slides are fixed by sticking, or else are held by means of a strip of transparent material, which is a serious disadvantage since this results in a deformation of the slides and in light absorption, and makes practically impossible the focusing of the optical images.

It has also been considered to use as a slide holder a composite band formed of two opaque bands applied against one another and held at regular space intervals by clamps, said composite band being provided between the clamped portions, with apertures through which the pictures on the slides inserted between the two bands are adapted to be seen. However, such an arrangement is inoperable in actual practice for the following reasons.

When it is desired that such a composite band formed by two coupled bands might be curved, it is necesary that the band placed outside the curve be slightly longer than the band placed inside the curve, so as to provide for the difference in the length of the radii of curvature of the two bands. This requirement cannot be fulfilled when the composite band is to be rolled up and therefore curved according to a curve of increasing radius, and still less so when the band is to be arranged according to a curve with curvatures of alternate directions. Both bands will then distort and markedly move apart from one another, thus preventing both the firm holding of the slides between these two bands and the focusing of the projections.

The purpose of the present invention is to provide a slide holder which is free of these drawbacks and which may therefore be curved according to curves of varying radii of curvature and/or curvatures of alternate directions while firmly holding the slides fixed thereto.

According to the invention, a slide holder is provided for separate flexible slides formed on rectangular film portions, said slide holder comprising a flexible band made of a single film of thermo-plastic material, having regularly spaced apertures and flexible, spaced holding members heated-welded on said band, resulting in space welded seams, free portions being provided between said welded seams and the edge portions of said holding members, whereby pockets are formed to receive marginal portions of flexible, rectangular sides which can be removably inserted between the surface of said band and said free portions of said holding members, the viewing fields of said slides registering with said apertures.

Said flexible band is preferably a cinematographic band with perforated edges of the usual type.

Figure 2:
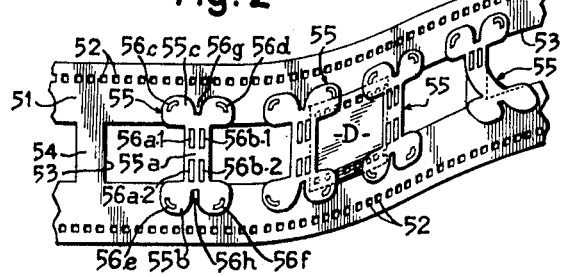

Further features and advantages of the invention will be apparent from the ensuing description with reference to the accompanying drawings illustrating preferred embodiments of the invention. In the drawings:

FIGURE 1 is a perspective view of the slide holder according to the invention and FIGURE 2 is a view, similar to FIGURE 1, of a modification of the invention.

Similar reference numerals designate similar parts in both figures.

According to the embodiment depicted, this band consists of a cinematographic band 51 having the perforations 52 of conventional pitch for driving this band and in which are provided, at regular intervals, apertures 53 separated by full portions 54. Between these apertures are fixed holding members 55 consisting of small plates of thermoplastic material; these small plates must be sufficiently flexible so that the band can be curved to obtain an endless band or can be rolled up on itself or wound onto spools; nevertheless, these small plates must be sufficiently rigid for maintaining firmly the edges of the flexible slides D inserted as described below between these members and the band.

These members have the form of a double T, that is they comprise of body 55a transversely arranged on the supporting band, on the full portions 54, said body being provided at its end with heads 55b, 55c, transversely arranged on the lateral longitudinal bands of the cinematographic band, in the two areas available between the row of apertures 53 and the two series of perforations 52. Preferably, the distance between the two heads 55b, 55c, of a same member is equal to the width of an aperture 53 and the width of the body 55a of this member is equal to the width of the full portions 54, so that the edges of the body 55a are aligned with the transverse edges of two consecutive apertures, and the inner edges of heads 55b, 55c border a portion of the longitudinal edges of these two consecutive apertures 53, on each side of the body 55a, as shown in the drawing.

Each of these members is fixed to the band by heat-welding, along seams 56a through 56f, with resulting formation on two opposite sides of each aperture of a pocket wherein can be inserted marginal portions of a flexible slide D which is thus removably held, and the entire viewing field is placed in front of an aperture without being covered by any transparent material.

This results especially in a good planeity of the surfaces which are passed through the projector or viewer and a good focusing of the projected views.

Such results are even better when use is made of the slide holder shown in FIGURE 2, according to a modification of the invention.

With respect to the aforementioned band, this latter band has the following differences:

The welded seams 56a, 56b of FIGURE 1 are replaced by discontinuous seams each formed by two portions 56a-1, 56a-2, or 56b-1, 56b-2; in place of two portions, each seam could comprise a larger number of portions;

Heads 55b of the T-shaped small plates 55 have a deep middle notch 55q or 55h;

The angles of the small plates 55 are rounded, as shown in the drawing.

Thus are provided very flexible slide holders and are avoided practically any distortions and especially any tendency to a separation of the holding members from the band when the latter is wound or curved along curves of varying radii of curvatures of alternate directions.

Whatever the application of the invention, the use of perforated bands having the usual cinematographic pitch permits a precise positioning of apertures 53. By introducing a punch in each aperture, it is then possible to position exactly each member 55 with respect to the apertures.

The width of the band to be used is related to the size of the slides to be fixed.

For example, bands of the standardized 70 mm. size may be used with transparencies of the usual 24 x 36 mm. size, formed on band portions of standardized 35 mm. size; it is obvious that a 35 mm. band may be used with substandard size films (8 mm.; 9.5 mm.; 16 mm.).

The fixation members 55 may be of any thermoplastic material such as polyvinyl chloride.

Having now described my invention what I claim as new and desire to secure by Letters Patent is:

1. A slide holder for separate flexible lantern slides formed on rectangular film portions, said holder comprising a flexible band made of a single film of thermoplastic material having regularly spaced apertures whose dimensions correspond substantially to those of the viewing fields of the slides, and flat, flexible holding members for said slides, heat-welded on said band, said holding members being spaced from one another along said film with a portion thereof positioned on said band between said apertures; said heat weld between said band and said holding members resulting in spaced, welded seams spaced a distance apart from the periphery of said apertures along at least a portion of each side of said apertures, and a distance apart from the edges of said holding members, thereby providing pockets between said band and said holding members, the seams therebetween serving as abutments for the edges of flexible slides to be received therein, whereby said slides are positioned within said apertures.

2. Slide holder for separate flexible lantern slides formed of rectangular film portions, said holder comprising a flexible band made of a film of thermo-plastic material having regularly spaced apertures whose dimensions substantially to those of the viewing fields of said slides, and flat holding plates of thermo-plastic material, each of said plates comprising a middle band and two transverse end bands, the middle band being positioned transversely to said flexible band, between two consecutive apertures and so dimensioned that said plate borders portions of the periphery of said two consecutive apertures, said holding band being heat welded onto said flexible band and resulting in heat-welded seams formed a small distance apart from the edges of said periphery portion, whereby said seams serve as abutments to prevent any movement of translation of a flexible slide, marginal portions of which are inserted between said flexible band and edge portions of said holding plate.

References Cited by the Examiner
UNITED STATES PATENTS

| | | | |
|---|---|---|---|
| 1,271,247 | 7/1918 | Wade | 352—232 |
| 1,590,704 | 6/1926 | Semelroth | 88—26 |
| 1,840,719 | 1/1932 | Hutchinson | 88—26 |
| 2,252,632 | 8/1941 | Jones | 88—26 |

FOREIGN PATENTS

| | | |
|---|---|---|
| 546,010 | 6/1942 | Great Britain. |

NORTON ANSHER, *Primary Examiner.*
WILLIAM MISIEK, *Examiner.*